(12) United States Patent
Guo

(10) Patent No.: US 7,931,049 B2
(45) Date of Patent: Apr. 26, 2011

(54) NANO OR SUB-NANO FIR AND ANION METAL FUEL PIPES FOR MOTOR VEHICLES AND LIKE

(76) Inventor: Yixin Guo, Ronkonkoma, NY (US)

( * ) Notice: Subject to any disclaimer, the term of this patent is extended or adjusted under 35 U.S.C. 154(b) by 0 days.

(21) Appl. No.: 12/584,077

(22) Filed: Aug. 31, 2009

(65) Prior Publication Data

US 2011/0048570 A1 Mar. 3, 2011

(51) Int. Cl.
*F16L 9/14* (2006.01)
(52) U.S. Cl. ........ 138/140; 138/137; 138/141; 138/143; 138/DIG. 7
(58) Field of Classification Search ............... 138/137, 138/140, 141, 145, 146
See application file for complete search history.

(56) References Cited

U.S. PATENT DOCUMENTS

| | | | |
|---|---|---|---|
| 6,198,212 B1 * | 3/2001 | Kim et al. | 313/479 |
| 7,059,355 B2 * | 6/2006 | Otani et al. | 138/137 |
| 2004/0139731 A1 * | 7/2004 | Chiu | 60/275 |

FOREIGN PATENT DOCUMENTS

| | | | |
|---|---|---|---|
| CN | 1844289 A | * | 10/2006 |
| JP | 05096276 A | * | 4/1993 |
| WO | WO 2008059660 A1 | * | 5/2008 |

* cited by examiner

*Primary Examiner* — Patrick F Brinson
(74) *Attorney, Agent, or Firm* — Jinggao Li; Dragonson Corporat

(57) ABSTRACT

A fuel pipe that is made from general, nano or sub-nano metal materials and can be used for motor vehicles and ships includes a nano or sub-nano Far Infrared Ray (FIR) and anion carrier. The structures of the carrier are made up of nano or sub-nano tourmaline granules integrated into the carrier body made from general, nano, or sub-nano plastic, rubber, resin, or metal materials. The carrier can be the whole body, interior or exterior wall, or paste structures set on the inner or outer wall surface of the pipe. The carrier can reach a far infrared emission rate up to 96% from ~85% by general tourmaline materials and facilitate sufficient combustion by breaking fuel molecular group into pieces. As a result, the novel pipe can achieve an extra 12-percent fuel economy improvement. The percentage of toxic gas in the exhaust will be correspondingly reduced.

6 Claims, 2 Drawing Sheets

NANO OR SUB-NANO FIR AND ANION METAL FUEL PIPES FOR MOTOR VEHICLES AND LIKE

FIELD OF THE INVENTION

This invention describes a fuel pipe that can be applied in the gasoline or diesel engines of vehicles and ships. It is a distinct fuel pipe with nano or sub-nano FIR and anion carrier. The body of fuel pipe itself is made from general, nano, or sub-nano metal materials, and the carrier is made up of nano or sub-nano FIR and anion granules integrated into the body of the carrier made from general, nano, or sub-nano plastic, rubber, resin, or metal materials. The fuel pipe can make fuels burn efficiently, and it can also reduce the toxic exhausts of vehicles and ships such as carbon dioxide.

BACKGROUND OF THE INVENTION

As the demand for petroleum soars, to fix the issues of both high cost of petroleum and the exhausted emissions from the devices consuming petroleum become challenges for the society. There are two different types of fuel economizers in the market, that is, economizers with either outer circle model or joint model. The principle of a fuel economizer is: when fuel is flowing to the fuel economizers, fuel economizer magnetizes fuel molecules. The fact that carbon and oxygen have opposite magnetic polarity induces that both carbon and oxygen are easily fused together and produces a better and efficient combustion. As a result of the fusion of fuel and air, the engine works more efficiently, generates greater power, and reduces the consumption of fuel and the hydrocarbons (HC), carbon monoxide (CO) and nitrogen oxide that emanate from the exhaust.

The limitations of these two models of fuel economizers include: 1. Two models of fuel economizers can be installed only after customers buy vehicles or ships. It is very inconvenient for both customers and manufacturers to do the installation. 2. For both the outer circle model and the joint model fuel economizers, technical problems exist with the installation. For example, for the joint model, in order to install the fuel economizer, the transmitting pipeline is needed to be severed. Because of the above limitations of the existing economizers, it is desired to have a more effective fuel economizer to overcome these shortcomings and achieve the target of fuel saving.

BRIEF SUMMARY OF THE INVENTION

The invention presents a metal fuel pipe effective for fuel saving and beneficial for environment protection. The detailed descriptions of the invention are: a FIR anion fuel pipe can be applied to vehicles and ships; the said fuel pipe comprises a pipe body made from general, nano, or sub-nano metal materials and a carrier; the structures of the carrier, which is also named as FIR and anion carrier, are made up of nano or sub-nano tourmaline or tourmaline and germanium ore granules integrated into the carrier body made from general, nano, or sub-nano plastic, rubber, resin, or metal materials, that is, the carrier consists of two parts: 1. nano or sub-nano granules for the purpose of FIR and anion; these granules are around 5~20% of the carrier in weight; 2. the left 80~95% materials in weight, called as the carrier body, is made from general, nano, or sub-nano materials that can be plastic, rubber, resin, or metal materials; the granules and the carrier body are mixed together to form the carrier. Embodiments of the present invention are described below in details with reference to the accompanying drawings, that is, a fuel pipe includes a carrier.

1. The structures of the said carrier are made up of nano or sub-nano FIR and anion granules and the said carrier is integrated into the body of the said pipe forming a singular pipe body. The body of the carrier is made from general, nano, or sub-nano plastic, rubber, or metal materials.
2. The structures of the carrier are made up of nano or sub-nano FIR and anion granules and the said carrier is the interior or exterior wall of the said pipe. The body of the carrier is made from general, nano, or sub-nano plastic, rubber, or metal materials.
3. The structures of the said carrier are pastes made up of nano or sub-nano FIR and anion granules pasted to the inner or outer wall surface of the said pipe. The body of the carrier is made from general, nano, or sub-nano resin materials.
4. The fuel pipe body is made up of general, nano, or sub-nano metal materials.
5. Inside diameter of the said metal fuel pipe is normally from 6 mm to 16 mm.

DETAILED DESCRIPTION OF THE INVENTION

Figure 1:
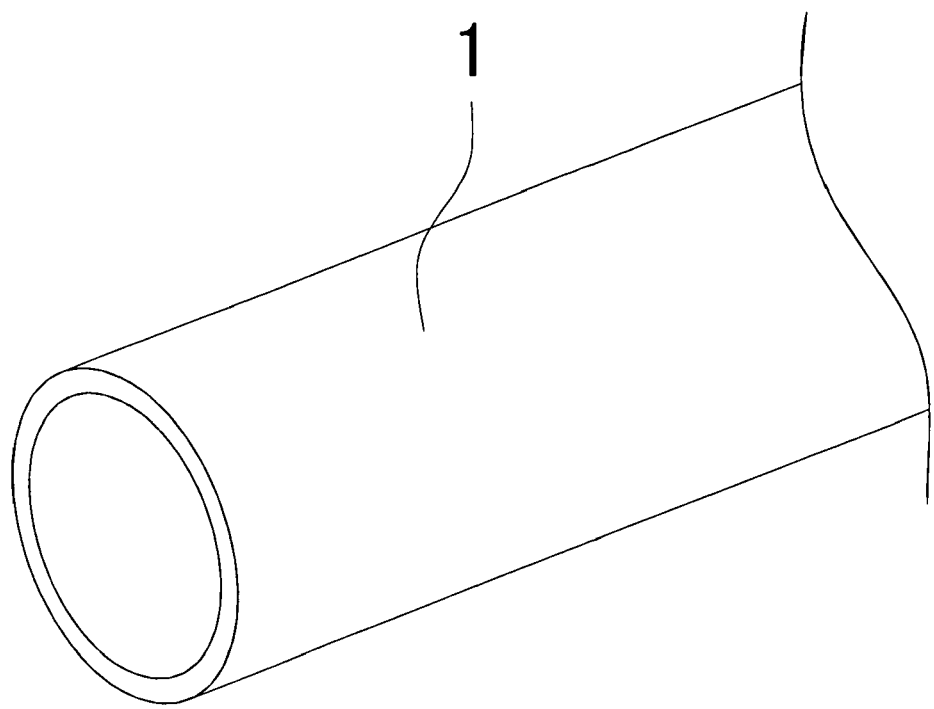
FIG. 1 is a three-dimensional view of a nano or sub-nano fuel pipe for vehicles and ships.

The terms and contents in the above descriptions are explained as follows:

1. In the above descriptions, "nano or sub-nano fuel pipe for vehicles and ships" means a fuel pipe made from general, nano, or sub-nano metal materials including a nano or sub-nano FIR and anion carrier that can be applied to the internal combustion engines of vehicles and ships.
2. In the above descriptions, "nano or sub-nano tourmaline ore granules" can generate FIR and anion, and "nano or sub-nano germanium ore granules" mainly generate anions. Other materials that can generate anions include, but are not limited to: Gui gems, Shenzhou stones, and tourmaline. These anion materials can be used either separately or with two or more combined.
3. In the above descriptions, the carrier includes two parts: nano or sub-nano FIR and anion granules and a carrier body made from general, nano, or sub-nano plastic, rubber, resin, or metal materials. These two are mixed with each other, and the mixture is called as the carrier.

In the structures of carrier, 5-20% of the carrier in weight is made up of nano or sub-nano tourmaline or tourmaline and germanium granules and the left 80~95% in weight is the carrier body. The structures of the carrier can be integrated into the of the pipe, or may be the interior wall or exterior wall, or formed as paste structures set on inner or outer wall surface of the pipe.

4. Nano tourmaline ore granules generate FIR and the emission rate can be up to 96%, which is higher than what regular tourmaline ore granules can generate. Nano germanium ore granules can generate more anions than what regular germanium ore granules can generate.
5. Sub-nano tourmaline ore granules generate FIR and the emission rate can be up to 92%, which is higher than what regular tourmaline ore granules can generate. Sub-nano germanium ore granules can generate more anions than what regular germanium ore granules can generate.
6. The fuel pipe body is made up of general, nano, or sub-nano metal materials.
7. When the structures of the carrier are integrated into the body or are the interior or exterior wall of the pipe, the carrier body is made from general, nano, or sub-nano plastic, rubber, or metal materials.
8. When the structures of the carrier are pastes, the carrier body is made from general, nano, or sub-nano resin materials.
9. Size of nano granules is from 1 nm to 100 nm.
10. Size of sub-nano granules is from 101 nm to 999 nm.

The principle of the present invention is: when the fuel flows in FIR anion fuel pipe that can be used for vehicles and ships, the carrier of the pipe emits FIR and anion. This emission directly acts upon the fuel. When the van der Waals force between fuel molecules is destroyed by the emission of FIR and anion, long-chain molecules become single molecules and/or short-chain molecules. Therefore the average distances among molecules increases and fuel molecules have more space free to move. As a result, burning efficiency of the fuel will be improved greatly and the exhausted toxic gases will drop correspondingly. Based on the above theories, this present invention of FIR and anion fuel pipe for vehicles and ships has the following advantages over pipes with non-nanoized existing FIR and anion technologies:

1. The present invention of nano or sub-nano FIR anion fuel pipe for vehicles and ships itself is an efficient fuel economizer besides its fuel transportation. Nano or sub-nano FIR anion fuel pipe can save up to 12% more fuels than what non-nano FIR fuel economizers in the market can save;
2. The present invention of nano or sub-nano FIR anion fuel pipe for vehicles and ships emits FIR and anions. This emission rate is increased up to 96% from ~85% by a pipe without nano or sub-nano granules. This unexpected emission rate can provide a higher efficiency in fuel saving for nano or sub-nano FIR anion pipe.

The present invention has been illustrated with samples. Embodiments of the present invention are: a nano or sub-nano FIR anion metal fuel pipe for vehicles and ship comprises a pipe body 1; a FIR and anion nano or sub-nano granule carrier 2 is in the said pipe body 1; this nano or sub-nano granule carrier 2 comprises tourmaline or tourmaline and germanium nano or sub-nano ore granules. Detailed embodiments are described as follows.

Figure 2:
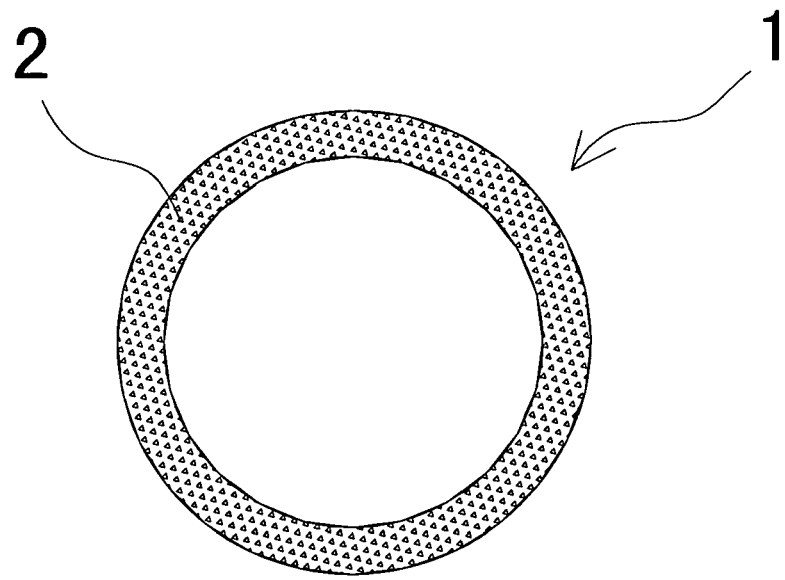
FIG. 2 is a side view of invention embodiments as stated in the above 1: a nano or sub-nano fuel pipe for vehicles and ships. The pipe comprises a carrier. The structures of the carrier are made up of nano or sub-nano granules, and the carrier is integrated into the body of the pipe forming a singular pipe body.
Figure 3:
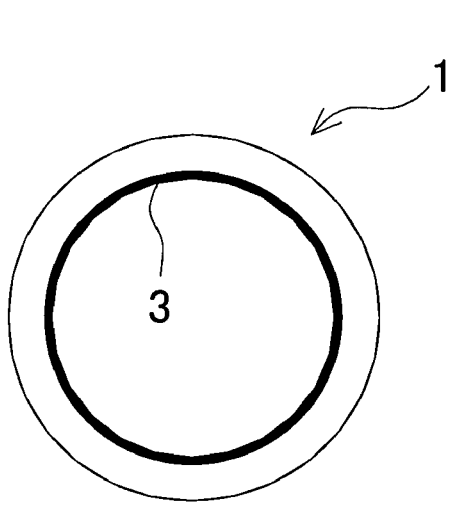
FIGS. 3 and 4 are side views of invention embodiments as stated in the above 3: a nano or sub-nano fuel pipe for vehicles and ships with paste structures set on the inner or outer wall surface of the pipe.
Figure 4:
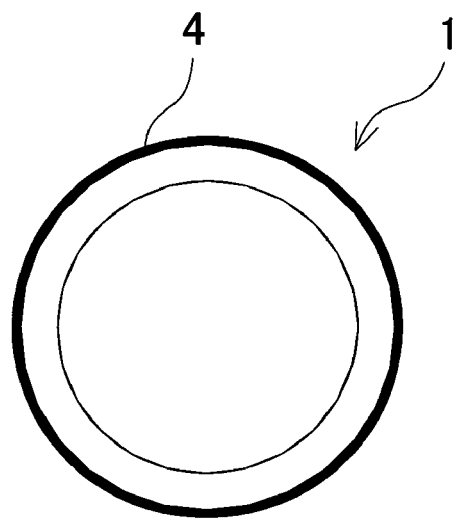
Figure 5:
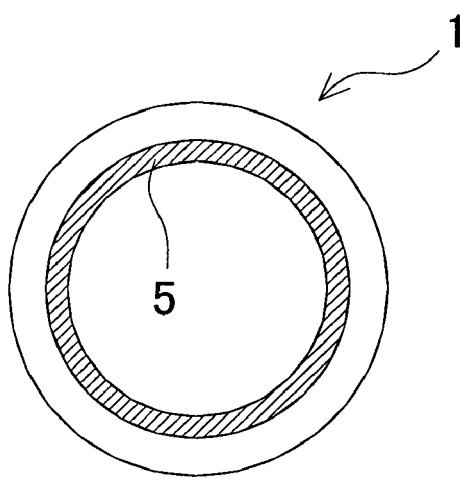
FIGS. 5 and 6 are side views of invention embodiments as stated in the above 2: a nano or sub-nano fuel pipe for vehicles and ships with interior or exterior layer as the carrier; the structures of the carrier are made up of nano or sub-nano granules, and the carrier is the interior or exterior wall of the pipe body.
Figure 6:
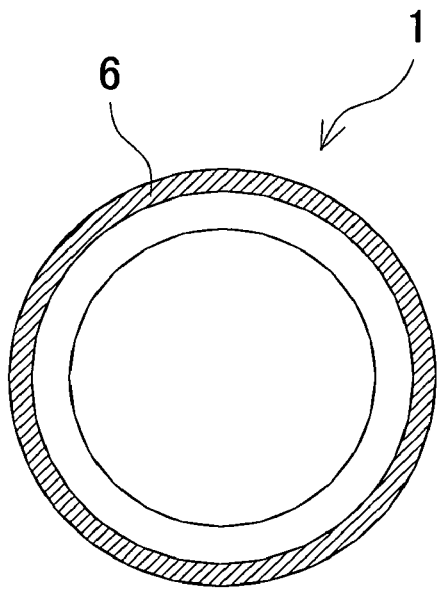

1. The carrier labeled as 2 is integrated into the body of the pipe with nano granules as shown in FIG. 2;
2. The carrier labeled as 2 is integrated into the body of the pipe with sub-nano granules as shown in FIG. 2;
3. The paste carrier labeled as 3 is paste pasted in the inner wall surface of the pipe with nano granules as shown in FIG. 3;
4. The paste carrier labeled as 3 is paste pasted in the inner wall surface of the pipe with sub-nano granules as shown in FIG. 3;
5. The paste carrier labeled as 4 is paste pasted in the outer wall surface of the pipe with nano granules as shown in FIG. 4;
6. The paste carrier labeled as 4 is paste pasted in the outer wall surface of the pipe with sub-nano granules as shown in FIG. 4.
7. The carrier labeled as 5 is the interior wall of the pipe with nano granules as shown in FIG. 5;
8. The carrier labeled as 5 is the interior wall of the pipe with sub-nano granules as shown in FIG. 5;
9. The carrier labeled as 6 is the exterior wall of the pipe with nano granules as shown in FIG. 6;
10. The carrier labeled as 6 is the exterior wall of the pipe with sub-nano granules as shown in FIG. 6.

The invention claimed is:

1. A fuel pipe comprising a pipe body, said pipe body comprising general, nano or sub-nano metal materials and a nano or sub-nano far infrared (FIR) pipe carrier comprising a carrier body and nano or sub-nano tourmaline granules or tourmaline and germanium ore granule materials integrated into the carrier body.
2. A fuel pipe according to claim 1, wherein the nano or sub-nano FIR pipe carrier is integrated into the pipe body forming a singular pipe body.
3. A fuel pipe according to claim 1, wherein the nano or sub-nano FIR pipe carrier is the interior or exterior wall of the fuel pipe.
4. A fuel pipe according to claim 1, wherein the nano or sub-nano FIR pipe carrier is in paste form and is pasted to the inner or outer wall surface of the fuel pipe.
5. A fuel pipe according to claims 2 or 3, wherein the carrier body comprises general, nano or sub-nano plastic, rubber or metal materials.
6. A fuel pipe according to claim 4, wherein the carrier body comprises general, nano or sub-nano resin materials.

* * * * *